Nov. 17, 1953  G. M. ACTON  2,659,180

PLANT BOX

Filed Sept. 10, 1949

Inventor
Grant M. Acton
By Fishburn + Mullendore
Attorneys

Patented Nov. 17, 1953

2,659,180

UNITED STATES PATENT OFFICE 2,659,180

PLANT BOX

Grant M. Acton, Arkansas City, Kans., assignor to Acton Products, Inc., Arkansas City, Kans., a corporation of Kansas Application September 10, 1949, Serial No. 115,057

2 Claims. (Cl. 47—38)

This invention relates to plant boxes and more particularly to such a box having one compartment containing soil and plant roots and another compartment containing water and/or a water and plant food solution with means for gradually feeding the water and food to the soil and plant roots.

The objects of the invention are to provide a container or box with an upper compartment for soil and plant roots, a lower compartment for water and plant food solution and a material having capillary capacity extending into the respective compartments for feeding the water and plant food solution into the soil; to provide a plant box with openings leading to a lower compartment for containing water, the level of which is spaced from the bottom of an upper compartment for movement of the air between the water level and bottom of the upper compartment; to provide a plant box structure which is simple and economical to manufacture of preferably non-corrosive metal; and to provide a sturdy, attractive plant box which is efficient in feeding water and food to plants therein for relatively long period without attention.

In accomplishing these and other objects of the present invention, I have provided improved details of structure, the preferred forms of which are illustrated in the accompanying drawing, wherein.

Figure 1:
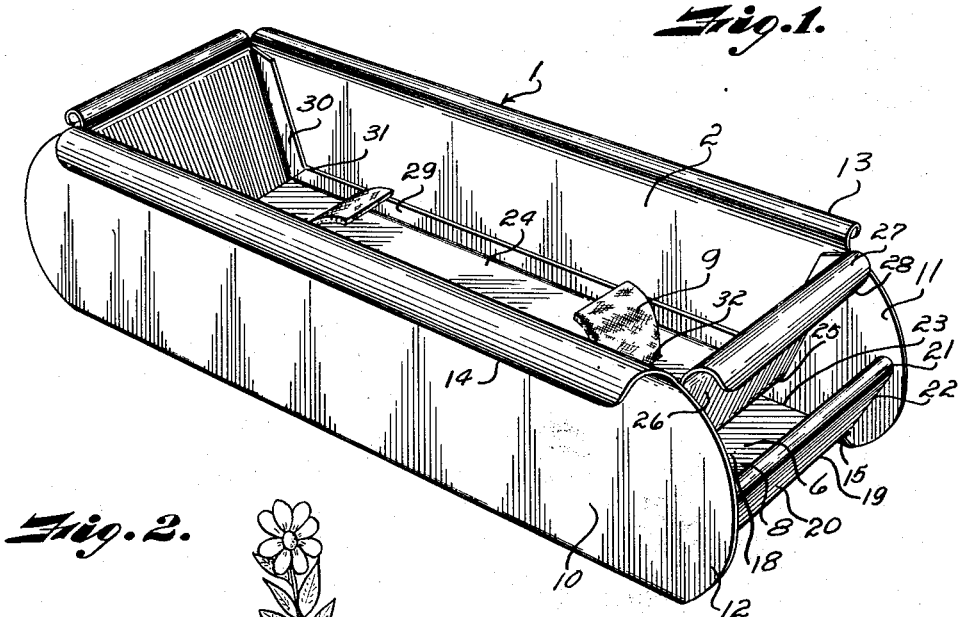
Fig. 1 is a perspective view of the plant box.

Referring more in detail to the drawings:

1 designates a plant box adapted to be constructed of sheet metal, preferably non-corrosive, and so formed as to have an upper compartment 2 for containing soil 3 and roots 4 of plants 5. The box also has a lower compartment 6 for containing water or a solution of water and soluble plant food 7. The lower compartment 6 preferably has openings 8 at the ends of the box and the water level preferably is spaced below the upper compartment whereby air may circulate through the openings 8 and over the water. Suitable material having capillary capacity such as wicking 9 is arranged in the box whereby the ends of said wicking extend into the respective upper and lower compartments to gradually feed the water and plant food solution into the soil which draws said water and plant food from the wicking to feed the roots 4.

It is preferable that the box be constructed of as few pieces as possible, each of which may be formed by suitable dies for quantity production at a minimum of cost and yet provide an attractive box. The preferred structure consists of spaced side members 10 and 11 arranged in vertical planes. The ends of the side members are preferably arcuate as at 12 and the upper edges turned outwardly to form flanges 13, said flanges preferably being rolled or otherwise formed to provide an arcuate cross section with the edges 14 turned downwardly.

The lower edges of the side members 10 and 11 are provided with flanges 15 which are turned inwardly and upwardly in spaced relation to the side members to form seats 16 adapted to receive downturned flanges 17 on a bottom member 18 which forms the bottom of the lower compartment 6. The flanges 17 are arranged on the sides of the bottom member 18 and are substantially coextensive in length with the flanges 15 on the side members 10 and 11 and when the flanges 17 are placed in the seats 16 the flanges 15 are crimped to securely fasten the bottom and side members in a rigid assembly.

The ends of the bottom member 18 are turned upwardly, as at 19, adjacent the ends of the flanges 15 to provide upwardly and outwardly sloping ends 20 of the lower compartment, said ends preferably terminating adjacent the vertical center of the side members 10 and 11, adjacent the arcuate edge 12 thereof, the upper edges 21 of said ends 20 being turned inwardly and rolled to add strength and enhance the appearance of said edges. The side edges 22 of the ends 20 engage the inner faces of the side members 10 and 11 and said engaging edges are preferably soldered or otherwise secured to the sides 10 and 11 to provide a watertight joint. Also the sides of the bottom member 18 are soldered or otherwise provided with a seal at the line of intersection with the side members as at 23 to provide a watertight joint whereby said lower compartment is adapted to contain the water and plant food solution 7.

Extending between the side members 10 and 11 and preferably formed of sheet metal is a bottom 24 of the upper compartment 2, said bottom preferably being arranged below the upper edges 21 of the ends 20 of the lower compartment and above the bottom member 18 to provide sufficient capacity in the lower compartment for containing water and plant food solution 7. The bottom 24 is bent upwardly as at 25 to form upwardly and outwardly sloping end members 26 spaced from the ends 20 of the lower compartment to provide the openings 8 at the ends of the box. The end members 26 extend upwardly to substantially the intersection of the arcuate ends 12 of the side members 10 and 11 with the curved flanges 13 on the upper edges of said side members. The ends 26 terminating in outwardly curved flanges 27 have an arcuate cross section and downwardly turned edges 28 to enhance the appearance thereof and also increase the rigidity of the structure.

The side edges of the bottom 24 and end members 26 are provided with upwardly turned flanges 29 and 30 respectively engaging the inner faces of the side members 10 and 11, the ends of said flanges 29 and 30 being cut on an angle to provide mitered joints 31 therebetween, and said flanges are preferably suitably secured to the side members 10 and 11 as by spot welding or the like to fix the bottom 24 and end members 26 to said side members and provide sufficient strength thereto whereby the upper compartment will support the weight of the soil 3 and plants growing therein. It is to be noted that when the sheet metal parts of the box are formed and secured as described, the structure forms a rigid, attractive plant box, and the curved flanges 13 and 27 on the upper edges of the side members 10 and 11 and end members 26 may be used as hand holds for facilitating moving of the box.

Suitably arranged in the bottom member 24 are a plurality of spaced transverse slots 32 through which strips of wicking 9 or other material having capillary capacity extend, said slots preferably being substantially the same size as the transverse dimensions of the wicking 9, whereby said wicking may be inserted through the slots and held in position without compressing said wicking. The lower ends of the wicking extend downwardly into the lower compartment and along the bottom 18 thereof whereby it is immersed in the water and plant food solution and the upper end of the wicking extends upwardly into the soil 3 to provide adequate contact therewith for feeding the water and plant food solution to the roots 4 of the plant 5. While the wicking 9 may have any desired cross section it is preferable that it be flat strips to increase the contact area with the water and plant food solution and with the soil.

Figure 2:
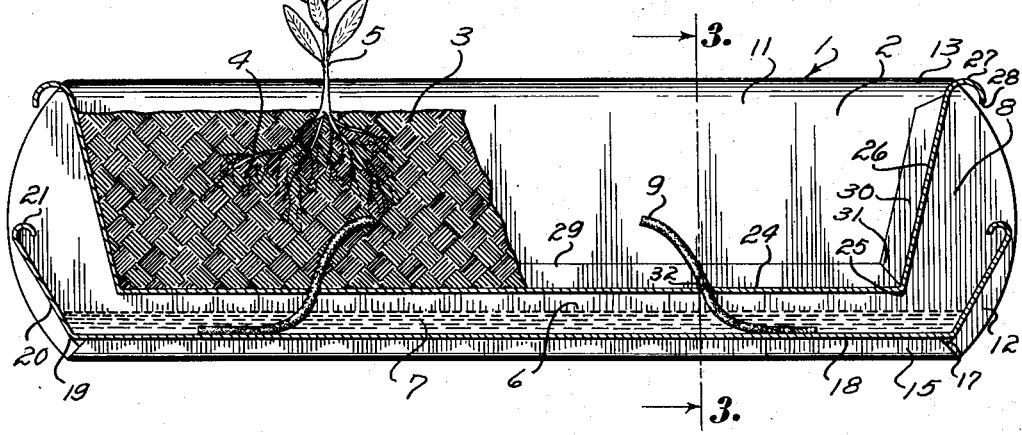
Fig. 2 is a longitudinal sectional view through the plant box illustrating the normal location of the soil, water and plant food solution and the capillary members for feeding said solution to the soil.
Figure 3:
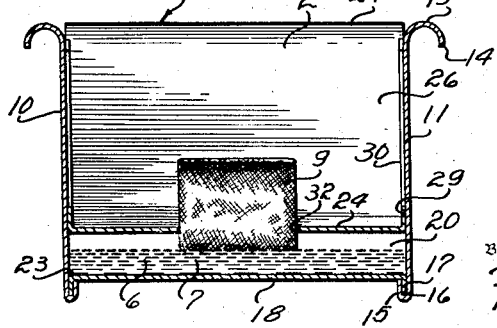
Fig. 3 is a transverse sectional view through the plant box on the line 3—3, Fig. 2.

In using a plant box constructed as described, the upper ends of the wicking are held and soil packed therearound to assure that the wicking will extend upwardly into the soil, as illustrated in Fig. 2. Then additional soil may be placed in the box and the plant roots located therein or seed planted as desired. The plant box is then placed in a suitable location and a mixture of water and soluble plant food solution poured into one of the end openings 8 whereby the level of said water and plant food solution is spaced slightly below the bottom 24. While the level of the solution could be above said bottom, it is preferable to keep the same below whereby the control of the feeding of water and plant food solution is by the capillary action of the wicking. Also the spacing between the level of the solution and the bottom 24 provides a passage for air through the end openings 8 and through the space between the solution and the bottom 24. With this arrangement, capillary action of the wicking will gradually feed the water and plant food solution into the upper compartment, the soil drawing the solution from the wicking and feeding it to the plant as it requires it and the box requires no further attention for a period of from one to two weeks, at which time the water and plant food solution may be replenished.

It is believed obvious that I have provided an attractive flower box adapted to be made from sheet metal and support plant life for relatively long periods without attention.

What I claim and desire to secure by Letters Patent is:

1. A plant box of the character described comprising, a metal container having spaced side walls, said side walls having lower edges adapted to rest on a support surface for the container, a bottom wall extending between the side walls above the lower edges thereof whereby said bottom wall is above the supporting surface for the container, upwardly and outwardly sloping end walls on the bottom wall, the side edges of the bottom and end walls being secured to the side walls to form watertight joints, said end walls terminating substantially midway the height of the side walls, a partition extending between the side walls below the upper edges of the end walls and in spaced relation to the bottom wall to form a space between the partition and the bottom wall for receiving a quantity of water and plant food with the surface of said water and plant food spaced below the partition, said partition terminating in spaced relation to the end walls, end members on the partition and extending upwardly and outwardly therefrom and spaced from the upwardly and outwardly sloping end walls on the bottom wall to form an upwardly opening passage between the end walls and end members at each end of the container communicating with the space between the bottom wall and partition whereby air circulates through the passages and space over the surface of the water and plant food, upwardly and inwardly turned flanges, respectively, on the partition and end members secured to the side walls whereby the side walls, end members and partition define an open top soil receptacle, outwardly turned curved flanges on the upper edges of the end members, said partition having a plurality of apertures therein, and strips of material having capillary capacity extending through said apertures with end portions projecting into water and plant food contained in the water-receiving space and into the soil in the soil receptacle whereby water and plant food are elevated by said strips into the soil.

2. A plant box of the character described comprising, a metal container having spaced side walls, an outwardly turned curved flange on the upper edge of said side walls, inwardly and upwardly turned flanges on the lower edges of said side walls, said lower edges of the side walls being adapted to rest on a support for the container, a bottom wall extending between the side walls and spaced above the lower edges thereof, downwardly turned flanges on the sides of said bottom wall and seating between the side walls and upwardly turned flanges on the lower edge thereof whereby said bottom wall is above the lower edges of the side walls and supporting surface therefor, upwardly and outwardly sloping end walls on the bottom wall and having side edges secured to the side walls, said end walls terminating substantially midway the height of the side walls, an inwardly turned curved flange on the upper edge of each of said end walls, a partition extending between the side walls in spaced relation to the bottom wall and below the upper edges of the end walls to form a space between the partition and bottom wall for receiving a quantity of water and plant food with the surface of said water and plant food spaced below the partition, said partition terminating in spaced relation to the ends of the side walls, end members on the partition and extending upwardly and outwardly therefrom and spaced from the upwardly and outwardly sloping end walls on the bottom wall to form an upwardly opening passage between the end walls and end members at each end of the container communicating with the space between the bottom wall and partition whereby air circulates therethrough over the surface of the water and plant food, upwardly and inwardly turned flanges, respectively, on the partition and end members secured to the side walls whereby the side walls, end members, and partition define an open top soil receptacle, outwardly turned curved flanges on the upper edges of the end members, said partition having a plurality of apertures therein, and strips of material having capillary capacity extending through said apertures with end portions projecting into water and plant food contained in the water-receiving space and into the soil in the soil receptacle whereby water and plant food are elevated by said strips into the soil.

GRANT M. ACTON.

References Cited in the file of this patent

UNITED STATES PATENTS

| Number | Name | Date |
|---|---|---|
| 190,580 | Hall | May 8, 1877 |
| 1,133,836 | Bolger | Mar. 30, 1915 |
| 1,170,402 | Bolger | Feb. 1, 1916 |
| 1,229,022 | Bolger | June 5, 1917 |
| 1,305,434 | Barlow | June 3, 1919 |
| 1,601,259 | Pettigrew | Sept. 28, 1926 |
| 1,948,031 | Guille | Feb. 20, 1934 |
| 2,089,220 | Norman | Aug. 10, 1937 |
| 2,346,029 | Jennings | Apr. 4, 1944 |
| 2,463,719 | Schackett | Mar. 8, 1949 |